(No Model.)  2 Sheets—Sheet 1.
C. B. WITHINGTON.
PHOTOGRAPHIC CAMERA.

No. 564,494. Patented July 21, 1896.

ATTEST.
C C Burdine
C. B. Bull.

INVENTOR:
C. B. Withington,
by
Dodge & Sons,
Attorneys.

THE NORRIS PETERS CO., PHOTO-LITHO., WASHINGTON, D. C.

(No Model.) 2 Sheets—Sheet 2.

C. B. WITHINGTON.
PHOTOGRAPHIC CAMERA.

No. 564,494. Patented July 21, 1896.

Witnesses
C. C. Burdine.
C. B. Bull.

Inventor:
Charles B. Withington
by Dodge Sons,
Attorneys

UNITED STATES PATENT OFFICE.

CHARLES B. WITHINGTON, OF JANESVILLE, WISCONSIN, ASSIGNOR OF ONE-HALF TO GEORGE W. WISE, OF SAME PLACE.

PHOTOGRAPHIC CAMERA.

SPECIFICATION forming part of Letters Patent No. 564,494, dated July 21, 1896.

Application filed November 2, 1895. Serial No. 567,754. (No model.)

*To all whom it may concern:*

Be it known that I, CHARLES B. WITHINGTON, a citizen of the United States, residing at Janesville, in the county of Rock and State of Wisconsin, have invented certain new and useful Improvements in Cameras, of which the following is a specification.

My invention relates to magazine-cameras, and has reference more particularly to that class of devices in which the film is made in the form of a sheet and wound from one roller onto another, the invention comprising various features, details, and combinations hereinafter fully set forth and claimed.

Figure 1:
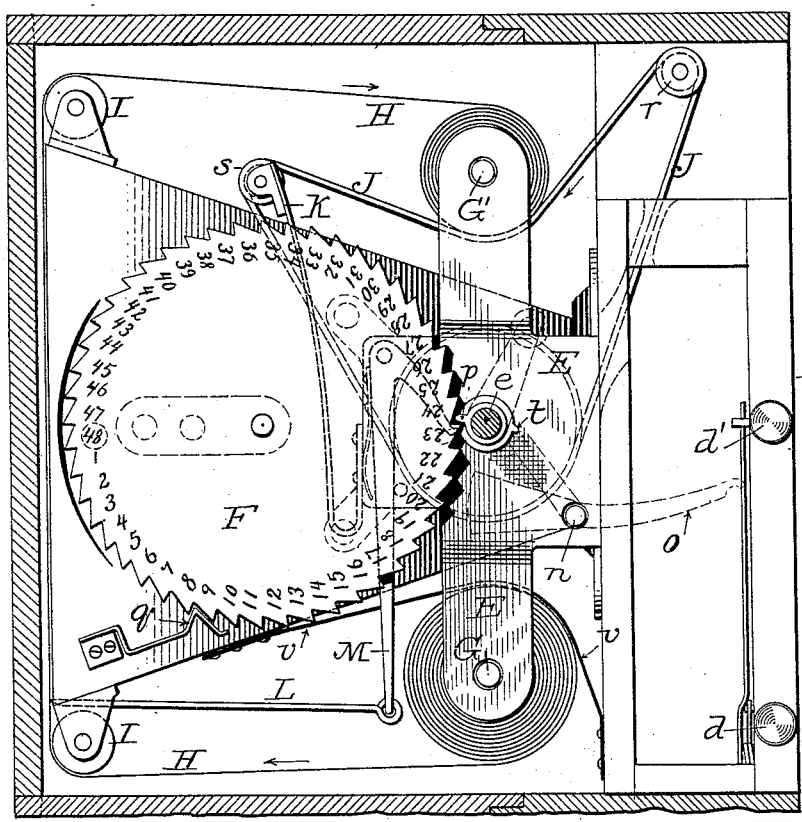
Figure 2:
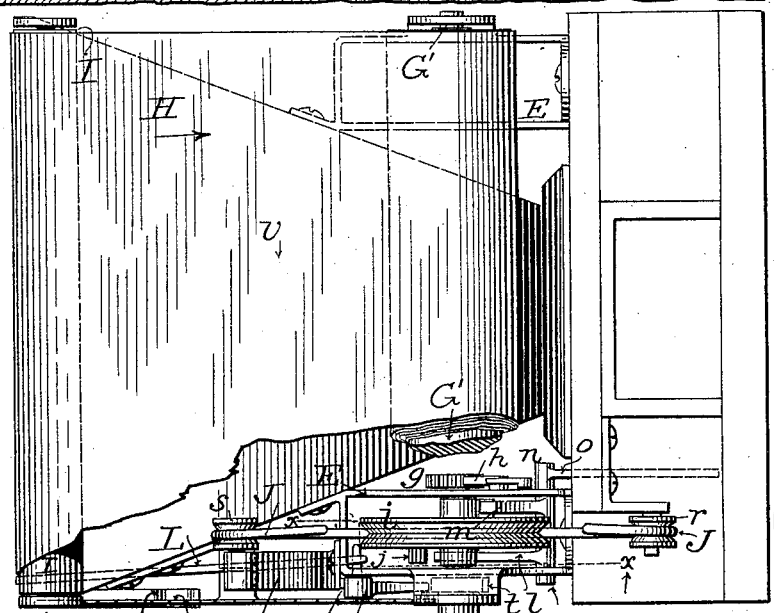
Figure 3:
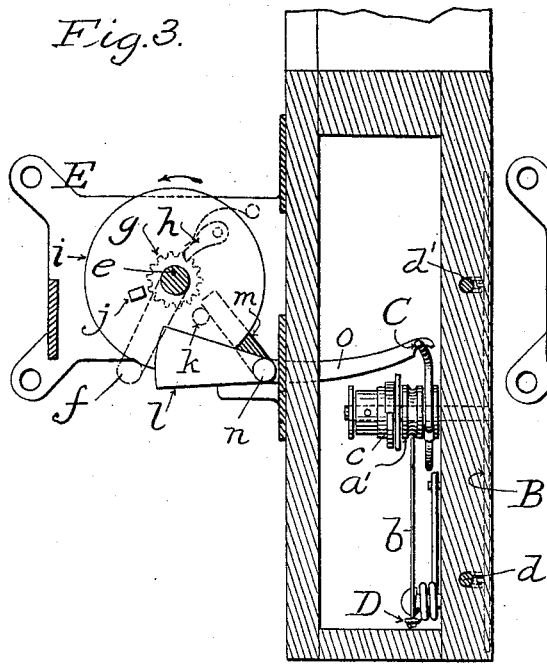
Figure 4:
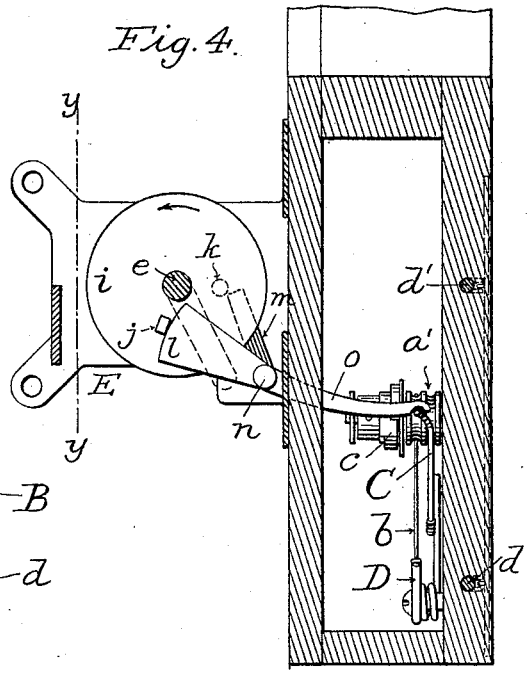
Figure 5:
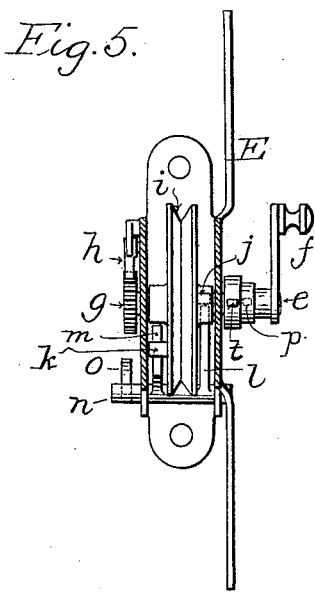

In the drawings, Figure 1 is a side elevation of my improved camera, with the box or casing and other parts in section; Fig. 2, a top plan view, also partly in section; Figs. 3 and 4, vertical sectional views, from front to rear, on the line $x\ x$, Fig. 2, showing the mechanism for effecting the winding of the shutter mechanism; Fig. 5, a vertical transverse sectional view of the same on the line $y\ y$, Fig. 4; and Fig. 6, a perspective view of the same mechanism and attendant parts with the framework or supports omitted.

A represents the box or casing, which may be of the usual construction, except as hereinafter specified.

B indicates a shutter provided with winding mechanism and releasing-buttons for time and instantaneous exposure, substantially as in my Patents Nos. 501,703 and 538,806, to which reference is hereby made. It might be well to state here, in a general way, that the shutter-actuating or winding mechanism comprises, among other elements, the shutter B; a pivoted arm or lever C; a cord $a$, which is connected at one end to the lever and at the other end to a loose collar $a'$ on the shutter-shaft; a spring D; a cord $b$, connected at one end to the spring and at the other end to the collar; a clutch $c$, secured to the shaft of the shutter and connecting with the collar, and time and instantaneous exposure buttons $d\ d'$ for arresting and releasing the shutter.

Obviously, other forms of shutter-actuating mechanism may be substituted for that shown, provided it has an actuating arm or lever C or its equivalent, to be acted upon by the devices hereinafter described.

In a suitable frame or support E is a shaft $e$ whose outer end projects out through the side of the box or casing A, where it is provided with a crank, handle, or thumb-piece $f$ by means of which said shaft may be turned. On its inner end the said shaft carries a ratchet-wheel $g$, designed to be engaged by a pawl $h$ mounted on the frame E, Figs. 2, 3, and 5, whereby backward rotation of the handle and shaft is prevented. Shaft $e$ carries a wheel or pulley $i$, which has on its outer face a lug $j$ and on its inner face a lug $k$, as shown in Figs. 2, 3, 4, and 5, which lugs are designed to engage, respectively, arms $l$ and $m$ projecting from a rock-shaft $n$ journaled in the same frame as the shaft. It will be noticed upon reference to Figs. 3 and 4 that the arms $l$ and $m$ are out of line with each other—project from the shaft at different angles—and that the shaft is further provided with a long arm $o$, which projects into the shutter compartment and engages the shutter-winding lever C. Further, it will be observed, upon reference to Figs. 3, 5, and 6, that the arm $l$ is enlarged at its outer end to afford an extended face against which the lug $j$ shall strike, and by which the further motion of the wheel $i$ and lug $j$ is prevented until the shutter has been released. When the lug $j$ is in engagement with the arm $l$, the lug $k$ will have just moved beyond or cleared the arm $m$, as indicated in Fig. 4.

Now, when the wheel $i$ turns to the left the lug $k$ will strike the arm $m$, (see Fig. 3,) and by riding along said arm will rock the shaft $n$ and cause the arm $o$ thereof to depress the winding-lever C and put the shutter-spring under tension. While the shaft $n$ is being thus rocked the arm $l$ will be thrown up into the path of the lug $j$, as in Fig. 4, thereby preventing further rotation of the wheel to the left, backward rotation or rotation to the right being prevented by the pawl and ratchet $h\ g$. The parts will therefore remain in the position represented in Fig. 4 until the shutter is released, whereupon the lever C will rise and carry the arm $o$ up with it, thereby restoring the shaft $n$ and its arms to the position shown in Figs. 3 and 6.

Inasmuch as the shaft $e$ controls the movement of the film, it will be seen that it will be impossible to make two exposures on the same part of the film, the winding or setting of the shutter being effected by the same movement that causes the feed of the film.

Figure 6:
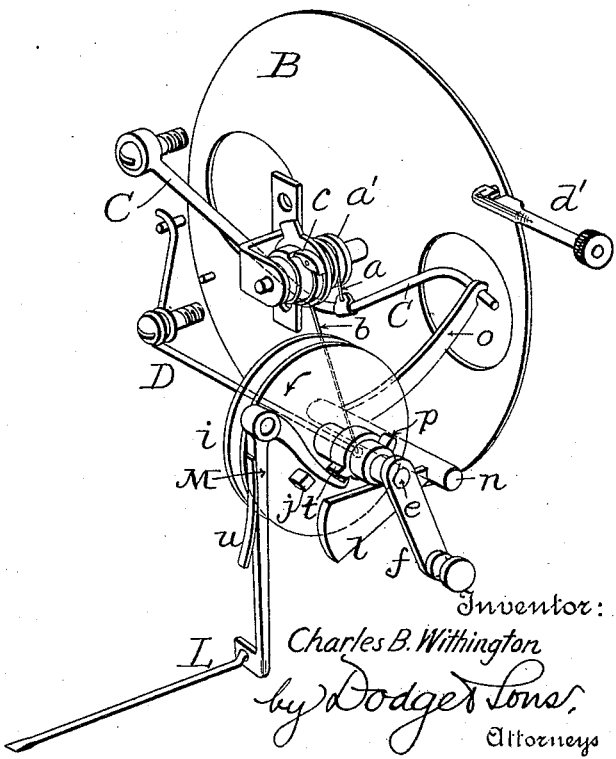

On the side wall of the exposure-compartment is journaled a ratchet-wheel F, the teeth of said wheel being arranged to be engaged by a lug or spur $p$ projecting from the shaft $e$, as shown in Figs. 1, 5, and 6. When the shaft is turned, the lug $p$ engaging the wheel will turn or rotate the latter a distance equal to the space between the teeth, and the wheel will be held in this position by the pawl or detent $q$, Figs. 1 and 2. On the face of the wheel there are numbers which are brought successively beneath an opening in the case A (shown in dotted lines in Fig. 1) in order that the number of exposures made may be readily determined.

On the frame E are two rollers G G' upon which the film H is wound, the film passing from the lower roll G to the upper roll G' over intermediate rolls I at the larger open end of the exposure-compartment, as shown in Figs. 1 and 2. In order to cause proper feed of the film, I employ a band or belt J, which passes around the lower side of pulley $i$, thence upward around a small pulley $r$ secured to the wall of the shutter-compartment, thence down beneath the upper roll G' and the film wound thereon, thence over a small wheel or pulley $s$ carried at the upper end of a spring-arm K, back to the main pulley $i$. The spring-arm constitutes a take-up and keeps the band or belt J taut, but it will readily yield as the film winds upon the upper roller. From this construction it will be seen that when the pulley $i$ of shaft $e$ is turned to make one complete revolution the belt or band J will be moved four inches, the circumference of said pulley, and the said belt or band, having a frictional contact with the roller G' or the film thereon, will turn the roller and cause the film to unwind from the roller G, which has less frictional resistance, onto the roller G'. As the movement of the belt or band is the same, or remains constant, the film will always be moved the same distance. A light elastic band $v$ passes over the lower roll G, Figs. 1 and 2, and prevents the roller from overrunning.

In order to determine the point at which the film is to be cut, (after having been removed from the camera,) I employ a reciprocating punch, knife, or marker L, which is arranged to mark or puncture the film at the lower edge of the open end of the exposure compartment, as shown in Fig. 1. This device L, which is guided at its front end in the wall of the exposure-compartment, is connected at its rear or inner end to an elbow-lever M pivoted in the frame E, Figs. 1, 2, and 6, the said lever being arranged behind the disk or wheel F, in position to be acted upon by a spur $t$ on shaft $e$. When the shaft $e$ is turned, the spur, acting upon the short arm of the lever, rocks the latter against the force of its spring $u$, and projects the device L against or through the paper or film H, the projection and retraction of the marker being effected during the completion of the rotation of the shaft at the instant, substantially, that the film has ceased to move.

It will be noted, upon reference to Fig. 1, that that part or portion of the box or casing A that incloses the film and the exposure compartment is separable from that part which carries the lens, finder, and shutter, the line of division being coincident with the shaft $e$, so that the removable or detachable part of the box may be separated from the other part without moving any of the operative parts of the camera. Suitable fastening devices will be employed to hold the parts of the casing together.

While I have described the lugs $j$ and $k$ as being formed integral with the wheel $i$, it is obvious that said lugs may be formed on separate disks attached to the shaft $e$, or may comprise simply arms projecting from said shaft. The construction shown is preferred, however, as it is compact, and I am able to utilize a moving part $i$, which is also used for other purposes, as before pointed out.

The operation of the machine is as follows, starting with the parts in the position shown in Fig. 3: If the shaft $e$ be turned to the left, as indicated by the arrow, the lug or projection $k$, riding along the under face of arm $m$, will rock or tip the rock-shaft $n$ and cause the arm $o$, carried by said rock-shaft, to depress the winding-lever C of the shutter-actuating mechanism. As the shaft $n$ is thus rocked, its arm $l$ is thrown up into the path of the lug $j$, as shown in Fig. 4, and further forward rotation of the wheel $i$ is prevented, backward rotation of the wheel being prevented by the pawl-and-ratchet mechanism $g$ $h$, before referred to. Just before the rotation of the shaft $e$ is completed the stud or spur $t$ of the shaft $e$ comes into engagement with the short arm of the elbow-lever M, Fig. 6, rocks said lever upon its pivot against the force of its spring $u$, and causes the pointer or marker L to engage the film-sheet H. Now, by pressing either of the buttons $d$ or $d'$, the shutter B is released, and the winding-lever C, being freed, is carried upward to the position shown in Fig. 3, through the intervention of the spring D and the cord $b$. It will be noted, however, that as the winding-lever C rises, it rocks the shaft $n$ in its bearings and throws the arm $l$ out of the path of the lug $j$. If now the shaft $e$ be turned again in the direction of the arrow, the film-sheet will, by means of the belt or band J, be unwound from the roller G and wound upon the roller G'. At the same time the lug or spur $p$ on the shaft $e$ will engage the toothed wheel F and move said wheel a distance equal to the space between two teeth.

The operation just described of moving or feeding the film or sheet brings a new or unexposed part of the sheet across the open end of the exposure-compartment; but during such movement of the film the shutter has not been set and there is no danger of making an accidental exposure.

From the foregoing it will be seen that the film-sheet is moved positively after each exposure or release of the shutter, and that inasmuch as the film-moving devices cannot be actuated until the shutter is released, there is no possibility of making two exposures upon the same part of the film.

Having thus described my invention, what I claim is—

1. In a camera, the combination with a rotary shutter and means for holding and releasing the same; of an operating mechanism for the shutter; an operating-shaft; and means between said shaft and the operating mechanism, for automatically locking the shaft against rotation until the shutter is released.

2. In a camera, the combination with a rotary shutter and means for holding and releasing the same; of an operating mechanism for the shutter; an operating-shaft; and connections for causing the setting of the shutter upon the partial rotation of the shaft and the automatic locking of the shaft until the shutter has been released.

3. In combination with the shutter and its motor-arm C; a shaft $e$; lugs $j$ and $k$ turning therewith; and a rock-shaft $n$ provided with an arm $o$ to engage the lever or arm C, and with arms $l$ and $m$ to be engaged by the lugs $j$ and $k$ respectively.

4. In combination with the shutter and its motor-arm C; a shaft $e$; lugs $j$ and $k$ turning therewith; a rock-shaft $n$ provided with an arm $o$ to engage the lever or arm C, and with arms $l$ and $m$ to be engaged by the lugs $j$ and $k$ respectively; and a pawl-and-ratchet device for preventing backward rotation of the shaft $e$.

5. In combination with the shutter and its motor-arm C; the shaft $e$ having wheel $i$; lugs $j$ and $k$ projecting from opposite faces of said wheel; a rock-shaft $n$ provided with an arm $m$ to be engaged by the lug $k$; an arm $l$ carried by the rock-shaft and arranged to be brought into the path of the lug $j$; and an arm $o$ carried by the rock-shaft $n$ and engaging the motor-arm C.

6. In combination with the shutter and its motor-arm C; the shaft $e$ having wheel $i$; lugs $j$ and $k$ projecting from opposite faces of said wheel; a rock-shaft $n$ provided with an arm $m$ to be engaged by the lug $k$; an arm $l$ carried by the rock-shaft and arranged to be brought into the path of the lug $j$; an arm $o$ carried by the rock-shaft $n$ and engaging the motor-arm C; and a spring D to raise the arm C and the arm $o$ resting thereon, thereby effecting the release of the shaft.

7. In combination with the rotary shutter, its motor-arm C, and the spring D for returning the latter to its normal position; the shaft $e$, an intermediate actuating and stop device, for actuating the arm C and for locking the shaft against rotation; and means for holding and releasing the shutter.

8. In a camera, the combination with the film-winding rolls G G'; of the shaft $e$ provided with pulley $i$; guide-pulleys $r$ and $s$; and the belt or band J passing about the pulleys $i$, $r$ and $s$, and in contact with one of the rolls or the film thereon.

9. In a camera, the combination with the film-winding rolls G G'; of the shaft $e$ and its pulley $i$; guide-pulleys $r$ and $s$; a yielding support for pulley $s$; and the endless band J passing about the pulleys and in contact with one of the rolls of the film thereon.

10. In a camera, the combination with the independent film-winding rollers G G'; of an endless belt or band engaging one of said rollers or the film thereon; and a driving-pulley for said belt independent of the film-rollers, said belt having a definite movement at all times.

In witness whereof I hereunto set my hand in the presence of two witnesses.

CHARLES B. WITHINGTON.

Witnesses:
JOHN CUNNINGHAM,
CLARENCE L. CLARK.